United States Patent
Zhu et al.

(10) Patent No.: US 10,902,458 B2
(45) Date of Patent: Jan. 26, 2021

(54) SYSTEM FOR PROVIDING A ROBUST MARKETING OPTIMIZATION ALGORITHM AND METHOD THEREFOR

(71) Applicant: WAL-MART STORES, INC., Bentonville, AR (US)

(72) Inventors: Tao Zhu, Millbrae, CA (US); Bin Li, Sunnyvale, CA (US); Thanh Ngo, Santa Clara, CA (US); Fnu Manasi, San Francisco, CA (US); Patrick Harrington, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 834 days.

(21) Appl. No.: 15/011,507

(22) Filed: Jan. 30, 2016

(65) Prior Publication Data

US 2017/0221089 A1 Aug. 3, 2017

(51) Int. Cl.
*G06Q 30/00* (2012.01)
*G06Q 30/02* (2012.01)

(52) U.S. Cl.
CPC ..... *G06Q 30/0243* (2013.01); *G06Q 30/0201* (2013.01); *G06Q 30/0244* (2013.01)

(58) Field of Classification Search
CPC .............. G06Q 30/02; G06Q 30/0201; G06Q 30/0243; G06Q 30/0244
USPC ................................ 705/14.41, 14.43, 14.42
See application file for complete search history.

(56) References Cited

U.S. PATENT DOCUMENTS

| 2014/0122245 | A1* | 5/2014 | Qu | G06Q 30/0269 |
| | | | | 705/14.66 |
| 2017/0186047 | A1* | 6/2017 | Li | G06Q 30/0275 |

OTHER PUBLICATIONS

D. Agarwal, R. Agrawal, R. Khanna, and N. Kota. Estimating rates of rare events with multiple hierarchies through scalable log-linear models. In Proceedings of the 16th ACM SIGKDD international conference on Knowledge discovery and data mining, pp. 213-222, 2010.
Deepak Agarwal, Bee-Chung Chen, Pradheep Elango, Nitin Motgi, Seung-Taek Park, Raghu Ramakrishnan, Scott Roy, and Joe Zachariah. Online models for content optimization. In Advances in Neural Information Processing Systems 21, pp. 17-24 , 2008.
P. Auer, N. Cesa-Bianchi, and P. Fischer. Finite-time analysis of the multiarmed bandit problem. Machine learning, 47(2):235-256, 2002.
(Continued)

*Primary Examiner* — Sun M Li
(74) *Attorney, Agent, or Firm* — Bryan Cave Leighton Paisner LLP

(57) ABSTRACT

A system and method for optimizing marketing campaigns is presented. Two marketing campaigns are received. Each is presented to a subset of users. The conversion rates of both marketing campaign are used to determine weighting of the two marketing campaigns. The weighting is determined using a range of conversion rates and maximizing the minimum expected value through the range of conversion rates. The process can be iteratively performed to converge upon an optimum weighting of the first and second conversion rates. More than two marketing campaigns can be used. The marketing campaign can be an email marketing campaign, a web marketing campaign, or an advertising keyword campaign. Other embodiments also are disclosed.

20 Claims, 5 Drawing Sheets

(56) References Cited

OTHER PUBLICATIONS

John C. Gittins. Multi-armed Bandit Allocation Indices. Wiley Interscience Series in Systems and Optimization. John Wiley & Sons Inc, 1989.
Thore Graepel, Joaquin Quinonero Candela, Thomas Borchert, and Ralf Herbrich. Web-scale Bayesian click-through rate prediction for sponsored search advertising in Microsoft's Bing search engine. In Proceedings of the Twenty-Seventh International Conference on Machine Learning (ICML-10), pp. 13-20, 2010.
O.-C. Granmo. Solving two-armed bernoulli bandit problems using a bayesian learning automaton. International Journal of Intelligent Computing and Cybernetics, 3(2):207-234, 2010. 2010.
T.L. Lai and H. Robbins. Asymptotically efficient adaptive allocation rules. Advances in applied mathematics, 6:4-22, 1985.
J. Langford. Tutorial on practical prediction theory for classification. Journal of Machine Learning Research, 6(1):273-306, 2005.
L. Li, W. Chu, J. Langford, and R. E. Schapire. A contextual-bandit approach to personalized news article recommendation. In Proceedings of the 19th international conference on World wide web, pp. 661-670, 2010.
L. Li, W. Chu, J. Langford, and X. Wang. Unbiased offline evaluation of contextual-bandit-based news article recommendation algorithms. In Proceedings of the fourth ACM international conference on Web search and data mining, pp. 297-306, 2011.
Benedict C. May, Nathan Korda, Anthony Lee, and David S. Leslie. Optimistic Bayesian sampling in contextual-bandit problems. Technical Report 11:01, Statistics Group, Department of Mathematics, University of Bristol, 2011. Submitted to the Annals of Applied Probability.
Benedict C. May and David S. Leslie. Simulation studies in optimistic Bayesian sampling in contextual-bandit problems. Technical Report 11:02, Statistics Group, Department of Mathematics, University of Bristol, 2011.
J. Sarkar. One-armed bandit problems with covariates. The Annals of Statistics, 19(4):1978-2002, 1991.
S. Scott. A modern bayesian look at the multi-armed bandit. Applied Stochastic Models in Business and Industry, 26:639-658, 2010.
Alexander L. Strehl, John Langford, Lihong Li, and Sham M. Kakade. Learning from logged implicit exploration data. In Advances in Neural Information Processing Systems 23 (NIPS-10), pp. 2217-2225, 2011.
William R. Thompson. On the likelihood that one unknown probability exceeds another in view of the evidence of two samples. Biometrika, 25(3-4):285-294, 1933.
K. Weinberger, A. Dasgupta, J. Attenberg, J. Langford, and A. Smola. Feature hashing for large scale multitask learning. In ICML, 2009.

\* cited by examiner

SYSTEM FOR PROVIDING A ROBUST MARKETING OPTIMIZATION ALGORITHM AND METHOD THEREFOR

TECHNICAL FIELD

This disclosure relates generally to computing systems, and relates more particularly to computing systems dealing with marketing campaigns.

BACKGROUND

Marketing campaigns are an important part of many different businesses. Marketers often desire to optimize their marketing campaigns for maximum effectiveness.

BRIEF DESCRIPTION OF THE DRAWINGS

To facilitate further description of the embodiments, the following drawings are provided in which.

Figure 1:
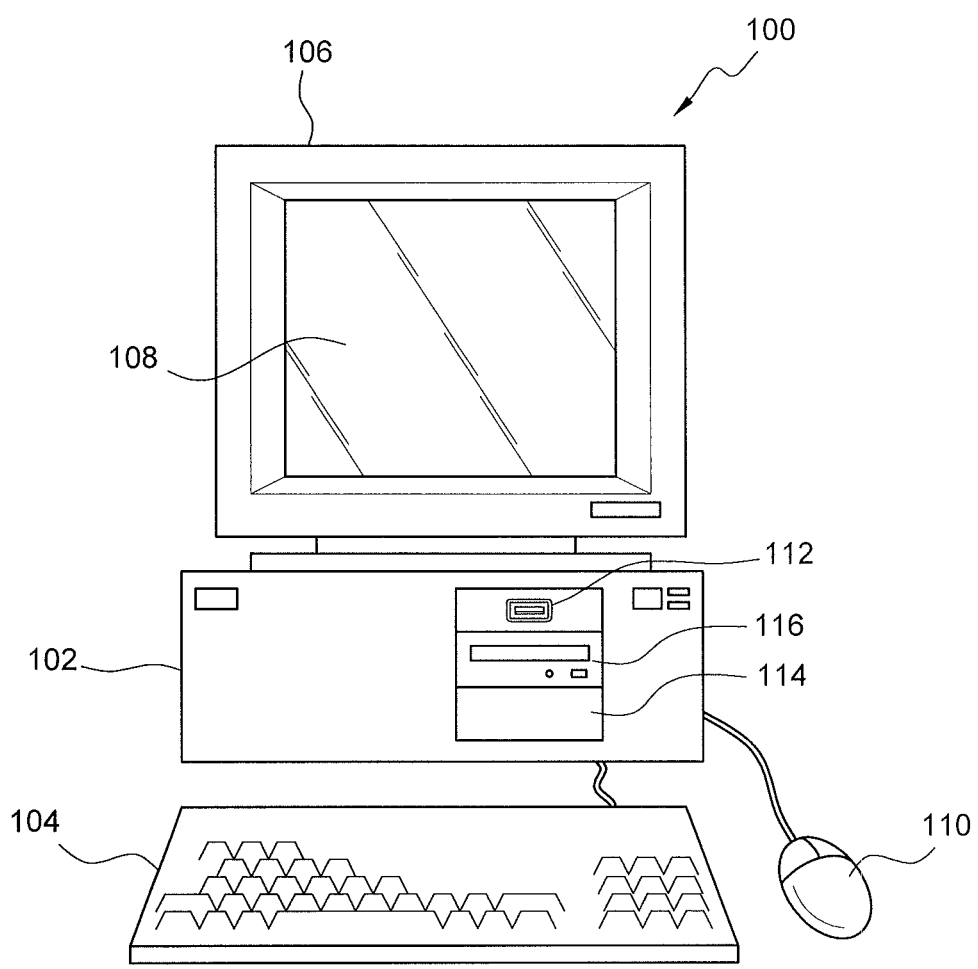
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: one or more processing modules; and one or more non-transitory memory storage modules storing computing instructions configured to run on the one or more processing modules and perform the acts of: receiving a first marketing campaign and a second marketing campaign; creating a first subset of users corresponding to the first marketing campaign and a second subset of users corresponding to the second marketing campaign; presenting the first marketing campaign to the first subset of users and the second marketing campaign to the second subset of users; determining a first conversion rate for the first marketing campaign; determining a second conversion rate for the second marketing campaign; comparing the first conversion rate with the second conversion rate to calculate an optimal weighting; and using the optimal weighting between the first marketing campaign and the second marketing campaign to present the first marketing campaign and the second marketing campaign.

Some embodiments include a method. The method can include: receiving a first marketing campaign and a second marketing campaign; creating a first subset of users corresponding to the first marketing campaign and a second subset of users corresponding to the second marketing campaign; presenting the first marketing campaign to the first subset of users and the second marketing campaign to the second subset of users; determining a first conversion rate for the first marketing campaign; determining a second conversion rate for the second marketing campaign; comparing the first conversion rate with the second conversion rate to calculate an optimal weighting; and using the optimal weighting between the first marketing campaign and the second marketing campaign to present the first marketing campaign and the second marketing campaign.

Figure 2:
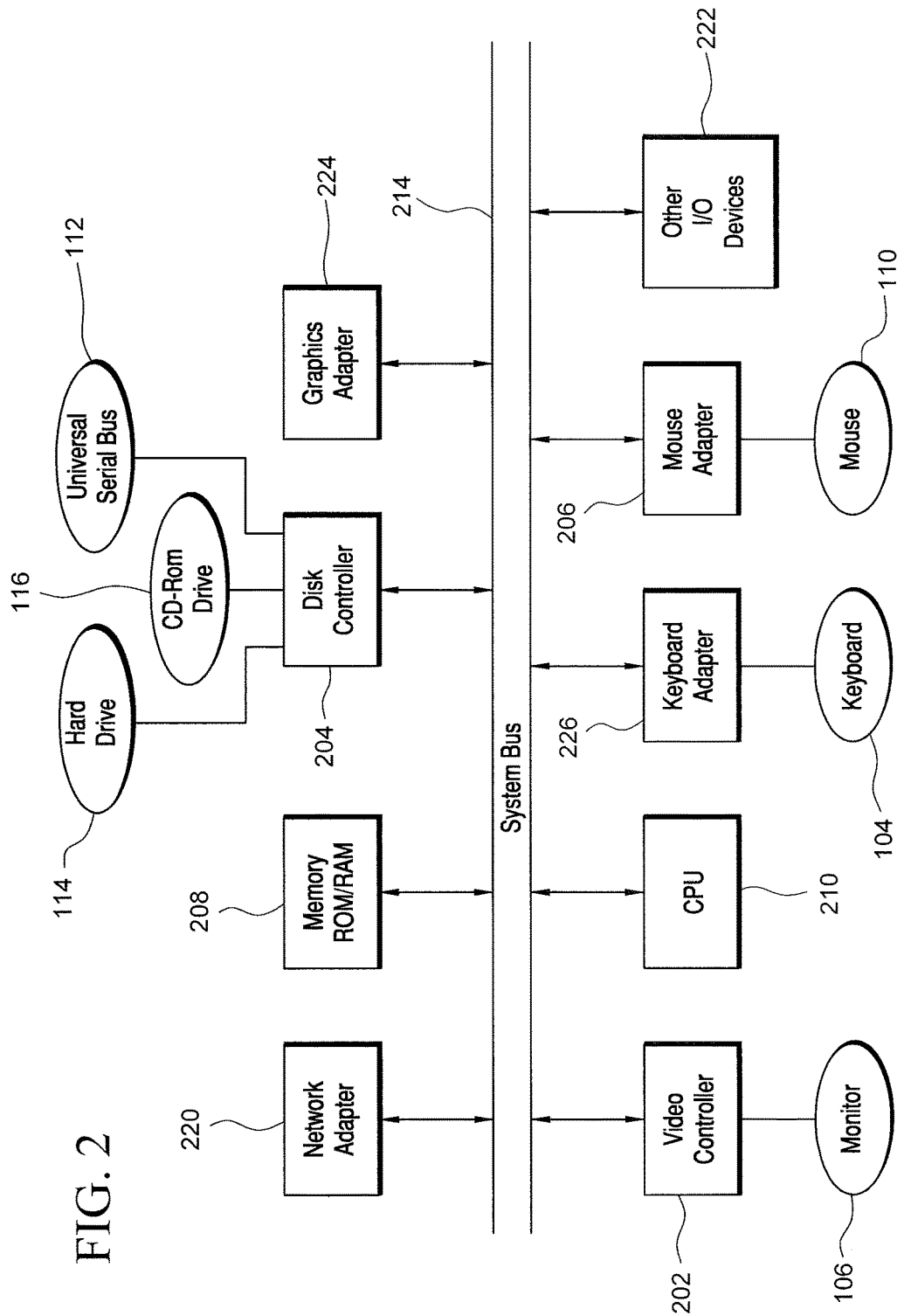
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Businesses and other entities that sell goods or services to the public often market their goods and services in a variety of different manners. Exemplary types of marketing include advertisements and direct mail. With the increasing popularity of computers, advertising is often provided via one of a variety of electronic manners, such as via email campaigns, pop-up ads, lead pages, web pages, and the like.

Those running marketing campaigns ("marketers") want to compare or evaluate various marketing campaigns. An exemplary use case is that a marketer might want to compare the performance of two or more different campaigns.

A/B testing (also known as "split testing") is a commonly used technique to compare campaigns. In A/B testing, two (or more) campaigns are presented to similar users at the same time. The actions of the users are compared to determine which campaign resulted in better performance. Performance is typically measured by conversion rate, which is the rate at which users presented with a campaign perform a desired action. Conversions can include buying from an e-commerce site, becoming a registered user, storing payment information, signing up for a subscription, downloading an item, requesting additional information, using a certain feature, upgrading an item, spending time at a site, returning to the site, and the like. Many different aspects of a campaign can be tested using A/B testing. For web pages, aspects of a web page such as font size, placement of information, and wording of information are commonly tested. For emails, aspects of the email campaign such as the subject line, wording, templates, recommendation modules, and calls to action are commonly tested. A/B can also be used to test keywords to be purchased on search engine advertising portals. In such a case, the conversion rate can be the keyword that results in the most clicks. Other aspects of web pages, emails, keywords, and other marketing campaigns also can be tested.

In an exemplary A/B testing of a campaign, two different campaigns are tested against each other. A subset of users is chosen. One half of the subset is presented with the first campaign. The other half of the subset is presented with the second campaign. Once enough data is obtained, the conversion rate of the first campaign is compared to the conversion rate of the second campaign. The campaign with the higher conversion rate might be selected as the chosen campaign. Thereafter, the chosen campaign is used for any remaining or future users.

As stated above, the campaigns being tested can be one of a variety of different types of advertising. Email campaigns are a popular choice because it is relatively easy to conduct A/B testing with an email campaign—two (or more) different emails are chosen, and the emails are sent to appropriate subsets of users. It is easy to track which subsets of users received which email campaign. Web campaigns might involve the use of cookies and other types of tracking in order to determine which users viewed a particular web campaign.

There are a few drawbacks to commonly used A/B testing strategies. For example, certain campaigns are time-sensitive. A campaign that won an A/B test run on one particular day might not be the winning campaign on a different day. However, because A/B testing strategies might take days to perform, sub-optimal A/B testing strategies would have to be used. In addition, non-winning campaigns are still seen by many customers, which can result in lost sales. For example, an email campaign might be targeted at 100,000 users. An A/B test might involve 10,000 emails being sent, 5,000 of each campaign being tested. It might later be found that the first campaign is 10 times more effective than the second campaign. But 5,000 potential customers received the lower-performing campaign, never seeing the higher-performing campaign.

Figure 5:
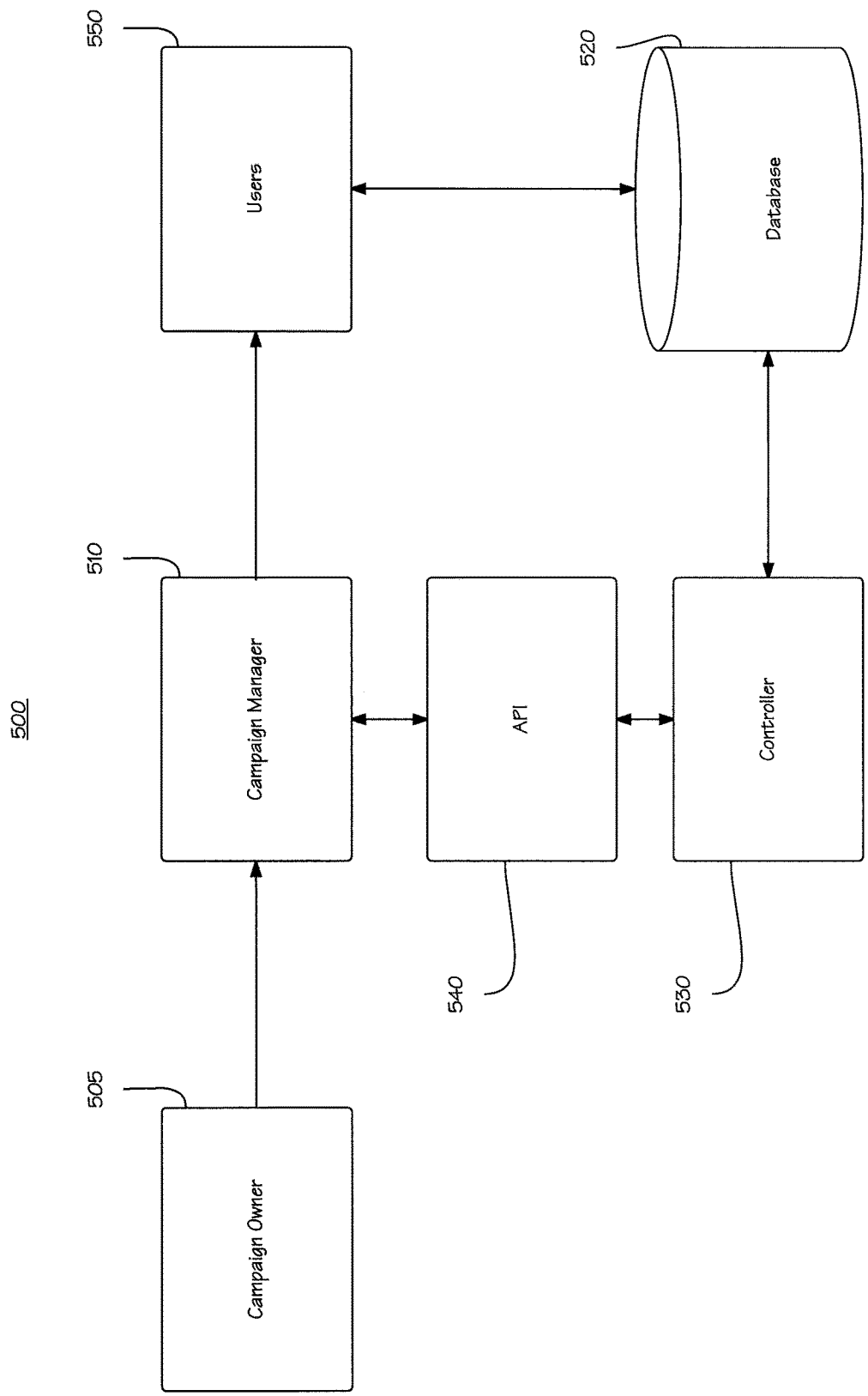
FIG. 5 is a block diagram illustrating a system capable of performing an embodiment.

Embodiments described herein disclose a more robust method and system for optimizing marketing campaigns. Embodiments can be performed on a system 500. FIG. 5 presents a block diagram of system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

System 500 is used by a campaign owner 505. Campaign owner 505 uses a campaign manager 510 to create two or more marketing campaigns to be A/B tested. It should be understood that system 500 is not limited to marketing campaigns via email and can be used for other types of marketing campaigns, including but not limited to web campaigns, mobile app campaigns, page layouts, and the like.

A campaign can be tested on a variety of users 550. Data from the users is collected by a database 520. The data collected includes the user's actions when presented with the campaign. With a web-based campaign, which boxes were clicked by each user can be tracked (also known as a clickstream), along with sales data and other data indicative of how well a campaign is working. If a first web campaign resulted in more sales than a second web campaign, it can be concluded that the first web campaign is more effective than the second web campaign, and the end result can be that the first web campaign is the campaign being shown to other or future users.

With an email campaign, the open rate of the email can be tracked along with the user's actions after being directed to a web page. Other methods of tracking users also can be used. Database 520 is accessed by a controller 530, which can perform a variety of different calculations on the data, to be described later. An application program interface (API) 540 reacts to the data from controller 530 in real-time. As data comes in, API 540 is able to control campaign manager 510 to dynamically control the allocation of the campaigns subject to the A/B test.

Controller 530 can use one of a variety of different algorithms to optimize the allocation of the campaigns. Let r be the reward vector (e.g., a conversion rate). The objective function is notated as follows:

$$E[\text{rewards}] = r_1 N_1 + \ldots + r_n N_n$$

Where E is the expected value of rewards, and r is the conversion rate of variation N, with a total number of n variations.

Another variable to consider is the weight to be applied to each variation:

$$w_i = \frac{N_i}{\sum_k N_k}$$

Where w is the weight, i is the index number, and k is a second index number

To optimize the reward would involve finding the maximum of the following equation:

$$\max_w r^T w, \text{ where } \Sigma_i w_i = 1, w_i \geq 0.$$

Where $r^T$ indicates the transpose of the matrix r.

A problem with the above equation is that the solution is to allocate all of the traffic to the immediate winner: the campaign that had the first conversion. However, because of the uncertainty associated with the metrics when the sample size is small (such as when only a few results are being tabulated), it is not desirable to allocate all of the traffic to the immediate winner.

In some embodiments, a solution of this problem is to reformulate the above equation as follows:

$$\max_w \min_{r \in U} r^T w, \text{ where } \Sigma_i w_i = 0, w_i \geq 0, \rho \text{ is the confidence level and}$$

$$U = \{r | \|\Sigma(r - \bar{r})\|_2 \leq \rho\}$$

In other words, instead of finding the maximum, the goal of the equation is to maximize the minimum—maximizing the worst case scenario. We assume that the true reward vector (the optimum reward) is within a radius around the calculated reward vector. At a given time t, we obtain the metric r at time t and obtain the optimal solution to the above robust optimization problem w*. As new data is processed, w* is updated such that the allocation of the campaigns is dynamically changed.

In some embodiments used with email campaigns, emails will be sent to a small subset of subscribers. A short time period later (fifteen minutes to one hour in some embodiments), data from the equations presented above is analyzed, and the proportion of users receiving each campaign is adjusted. This process can be repeated at the same periodic rate (e.g., every fifteen minutes to one hour) such that more users receive the more effective campaign even at a very early stage of the campaign.

Figure 3:
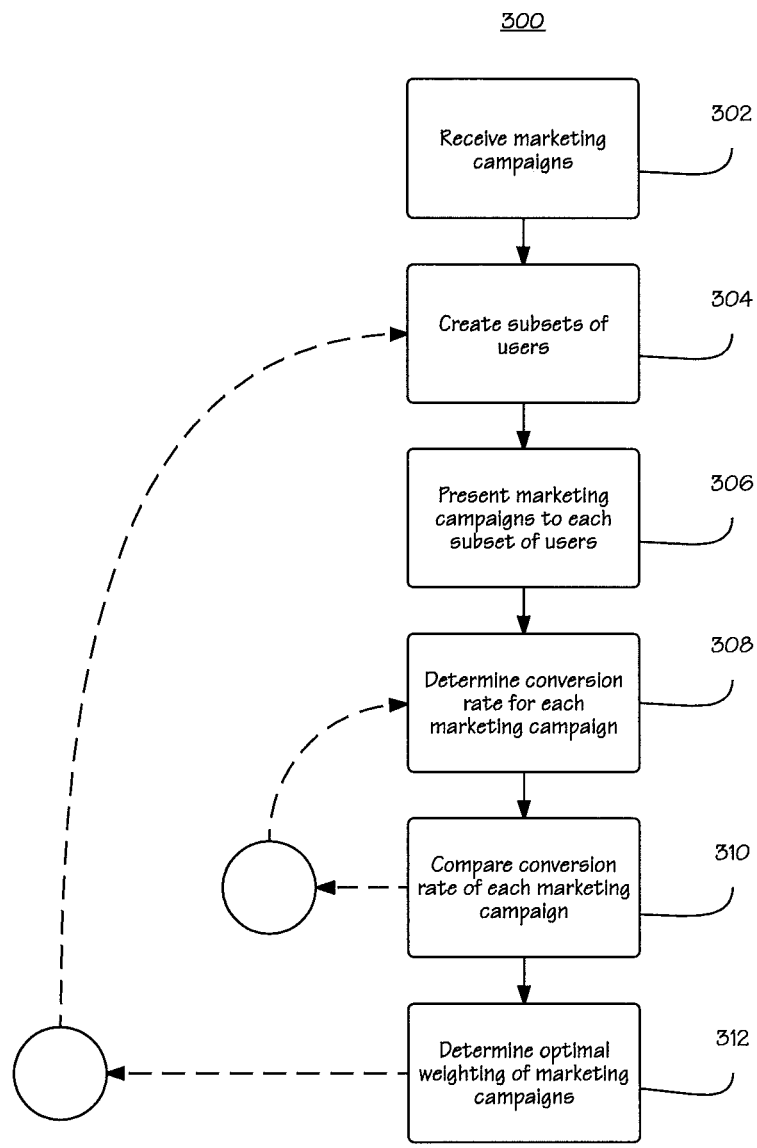
FIG. 3 is a flowchart illustrating the operation of an embodiment.

A flowchart illustrating a method 300 of implementing a robust algorithm for marketing campaigns is presented in FIG. 3. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, portions of method 300 can be implemented by computer system 100 (FIG. 1).

Method 300 might be used in any situation in which one wants to test two or more marketing campaigns using A/B testing (also known as split testing). Method 300 might be performed in controller 530 (FIG. 5). A first marketing campaign and a second marketing campaign are input into a system (block 302). A subset of users is created for each marketing campaign (block 304). When two marketing campaigns are used, two sample subsets of users are created from a set of users: a first subset of users and a second subset of users. Each subset of users is chosen to be a representative sample of the entire set of users. The number of users in each subset is chosen to be statistically significant. The number of users in each subset is substantially equal, and the demographic profile of each subset is roughly equal. Many different forms of sampling can be used, both those already known in the art and those developed in the future. In addition, the sample size (the number of users in each of the sample subsets) can be chosen by one of a variety of different methods, both those already known in the art and those developed in the future. In other embodiments, method 300 is used to test more than two marketing concepts at the same time.

The marketing campaigns are presented to the subsets of users (block 306). In some embodiments, the first marketing campaign is presented to the first subset of users, and the second marketing campaign is presented to the second subset of users. The presenting of marketing campaigns can take one of a variety of different forms. For an email marketing campaign, presenting comprises the first email campaign being sent by email to each of the first subset of users and the second email campaign being sent by email to each of the second subset of users. In such an embodiment, each of the first subset of users and the second subset of users had previously signed up for an email list or otherwise provided their email address for use in a marketing campaign.

For a web-based marketing campaign, there can be a method of tracking users accessing a website via a browser or a mobile device. Common methods of tracking users can be used, such as the use of cookies accessible by the browser. Cookies can be used to determine demographic information about the users. The demographic information can later be used to create the first subset of users and second subset of users. When a user in the first subset of users accesses a particular website, they are presented with a web page from the first marketing campaign. When a user in the second subset of users accesses a particular website, they are presented with a web page from the second marketing campaign. Other techniques also can be used.

The conversion rate of each marketing campaign is determined (block 308). The conversion rate is determined in one of a variety of methods now known or developed in the future. For an email campaign, the actions taken by each user presented with the email can be tracked. Statistics such as the percentage of users opening the email (open rate), the percentage of users taking a further action (such as purchasing an item), bounce rate, email forwarding rate, clickthrough rate, and the like can be tracked. For a web campaign, similar statistics can be tracked, using a clickstream and other data that tracks each user's actions when presented with the web campaign. For a keyword campaign, statistics such as cost per conversion, clickthrough rate, quality score, and cost per click can be monitored as part of a conversion rate.

The timing of this determination step can vary. In some embodiments, block 308 is executed after a threshold number of users have viewed each of the marketing campaigns. In some embodiments, block 308 is executed after a certain period of time has elapsed (e.g., fifteen minutes, one hour, or some other duration).

The conversion rates for each marketing campaign are compared to each other (block 310). In some embodiments, the comparison can involve the use of the following formulas described in further detail above:

$$\max_w \min_{r \in U} r^T w, \text{ where } \Sigma_i w_i = 1, w_i \geq 0, \text{ and}$$

$$U = \{r | \|\Sigma(r-\bar{r})\|_2 \leq \rho\}$$

As described above, the comparison can determine an optimum weighting between the first marketing campaign and the second marketing campaign. In some embodiments, blocks 308 and 310 can be performed iteratively. In some embodiments, the conversion rate determination can occur at regular intervals, such as every fifteen minutes or every hour.

After the optimal weighting is determined, the optimal weighting is applied to future marketing campaigns (block 312). The optimal weighting can change the proportion of the first subset of users to the second subset of users. For example, when a marketing campaign is created, the marketing campaign might be distributed equally between the first subset of users and the second subset of users.

In some embodiments, after block 312, the process iterates back to block 304. A third subset of users is created to receive the first marketing campaign and a fourth subset of users is created to receive the second marketing campaign. When run for the first time, the subsets of users might be approximately equal. After block 312 has been executed, the ratio between subsets (e.g., the third subset of users and the fourth subset of users) might be changed based on the conversion rates. For example, it might be found that the first marketing campaign is more effective than the second campaign. Therefore, the ratio between the third subset of users and second subset of users might be changed to 65 to 35 as being more effective than the 50 to 50 split.

As an iterative process, blocks 304 through 312 can be executed any number of times. Each time an iteration of blocks 304 through 312 is performed, the result should be more accurate, resulting in a convergence on an optimum split between the two marketing campaigns. The iterations can be performed periodically. Any time interval between iterations can be used. In some embodiments, the iterations can be performed as often as every 15 minutes. Other typical values can be every hour or every 24 hours.

Figure 4:
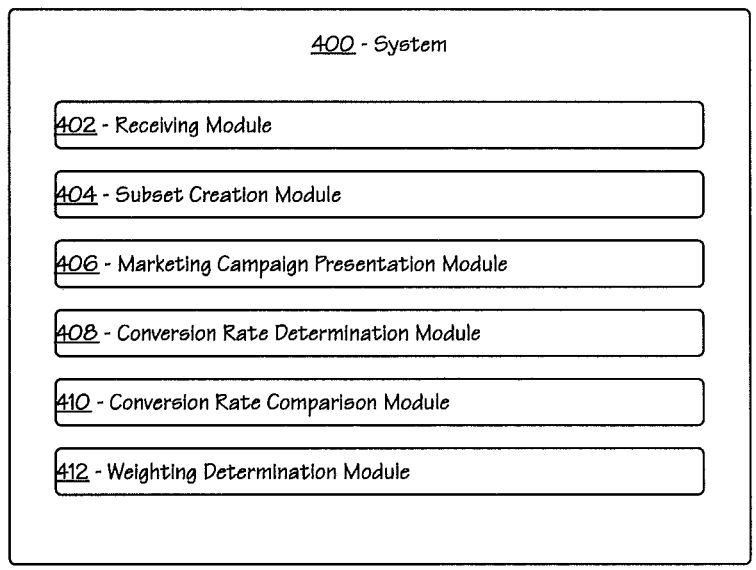
FIG. 4 is a block diagram illustrating a system capable of performing an embodiment.

Turning ahead in the figures, FIG. 4 illustrates a block diagram of a system 400 that is capable of performing disclosed embodiments. System 400 is merely exemplary and is not limited to the embodiments presented herein. System 400 can be employed in many different embodiments or examples not specifically depicted or described herein. In some embodiments, certain elements or modules of system 400 can perform various procedures, processes, and/or acts. In other embodiments, the procedures, processes, and/or acts can be performed by other suitable elements or modules.

In a number of embodiments, system 400 can include a receiving module 402. In certain embodiments, receiving module 402 can perform block 302 (FIG. 3) of receiving two or more marketing campaigns.

In a number of embodiments, system 400 can include a subset creation module 404. In certain embodiments, subset creation module 404 can perform block 304 (FIG. 3) of creating a subset of users for each marketing campaign In a number of embodiments, system 400 can include a marketing campaign presentation module 406. In certain embodiments, marketing campaign presentation module 406 can perform block 306 (FIG. 3) of presenting each marketing campaign to a subset of users.

In a number of embodiments, system 400 can include a conversion rate determination module 408. In certain embodiments, conversion rate determination module 408 can perform block 308 (FIG. 3) of determining a conversion rate for each marketing campaign.

In a number of embodiments, system 400 can include a conversion rate comparison module 410. In certain embodiments, conversion rate comparison module 410 can perform block 310 (FIG. 3) of comparing conversion rates of each marketing campaign.

In a number of embodiments, system 400 can include a weighting determination module 412. In certain embodiments, weighting determination module 412 can perform block 312 (FIG. 3) of determining an optimal weighting for each marketing campaign.

Preliminary testing and simulations of embodiments shows a significant increase in conversion rate compared to older methods. In some simulations, a conversion rate increase of greater than 20% compared to older techniques has been observed. In addition to the higher conversion rate, it has been found that processing speeds of embodiments are faster than the processing speed of older methods.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a processor; and
one or more non-transitory memory storage devices storing computing instructions configured to run on the processor and perform:
   receiving a first marketing campaign and a second marketing campaign at the one or more non-transitory memory storage devices;
   creating, by the processor, a first subset of users corresponding to the first marketing campaign and a second subset of users corresponding to the second marketing campaign;
   transmitting, by a network adapter, first storing instructions to store first cookies on first electronic devices of the first subset of users;
   transmitting, by the network adapter, second storing instructions to store second cookies on second electronic devices of the second subset of users;
   detecting, by the processor and the network adapter, a presence of the first cookies on the first electronic devices of the first subset of users;
   in response to detecting the presence of the first cookies on the first electronic devices, transmitting, by the network adapter, first display instructions to display the first marketing campaign on first graphical user interfaces (GUIs) on the first electronic devices of the first subset of users;
   detecting first interactions with the first marketing campaign displayed on the first GUIs on the first electronic devices of the first subset of users;
   detecting, by the processor and the network adapter, a presence of the second cookies on the second electronic devices of the second subset of users;
   in response to detecting the presence of the second cookies on the second electronic devices, transmitting, by the network adapter, second display instructions to display the second marketing campaign on second GUIs on the second electronic devices of the second subset of users;
   detecting second interactions with the second marketing campaign displayed on the second GUIs on the second electronic devices of the second subset of users;
   determining, by the processor and using the first interactions with the first marketing campaign, one or more first conversion rates for the first marketing campaign;
   determining, by the processor and using the second interactions with the second marketing campaign, one or more second conversion rates for the second marketing campaign;
   comparing, by the processor, the one or more first conversion rates with the one or more second conversion rates to calculate an optimal weighting by:
      determining a first range of possible values of the one or more first conversion rates;
      determining a first minimum expected value for the first range of possible values of the one or more first conversion rates;
      determining a second range of possible values of the one or more second conversion rates;
      determining a second minimum expected value for the second range of possible values of the one or more second conversion rates;
      calculating a first weighting for the first marketing campaign using the first range of possible values of the one or more first conversion rates;
      calculating a second weighting for the second marketing campaign using the second range of possible values of the one or more second conversion rates, wherein:
         the optimal weighting is based on the first weighting and the second weighting;
         the first weighting represents a first proportion of users to be allocated to the first subset of users; and
         the second weighting represents a second proportion of the users to be allocated to the second subset of users, wherein the users comprise first and second additional users not in the first or second subset of users;
      maximizing a minimum of the optimal weighting using a system of equations by:
         maximizing a minimum of the first weighting;
         maximizing a minimum of the second weighting;
         maximizing the first minimum expected value; and
         maximizing the second minimum expected value;
   using the optimal weighting between the first marketing campaign and the second marketing campaign to transmit, by the network adapter:
      third display instructions to display the first marketing campaign on electronic devices of the first additional users; and
      fourth display instructions to display the second marketing campaign on electronic devices of the second additional users; and
   updating, by the processor, the optimal weighting using a conversion rate of the first marketing campaign for the first additional users and a conversion rate of the second marketing campaign for the second additional users, wherein the system of equations comprises:

$$\max_{w} \min_{r \in U} r^T w, \text{ where } \sum_i w_i = 1, w_i \geq 0, \text{ and}$$

$$U = \{r \mid \|\sum (r - \bar{r})\|_2 \leq \rho\},$$

wherein:
   w comprises a weight;
   r comprises a matrix;
   $r^T$ comprises a transpose of the matrix;
   i comprises an index number; and
   $\rho$ comprises a confidence level.

2. The system of claim 1 wherein:
the first marketing campaign and the second marketing campaign are email marketing campaigns;
transmitting the first display instructions to display the first marketing campaign comprises sending the first marketing campaign via email to each user in the first subset of users regardless of whether the first cookie is detected on a respective electronic device of each respective user in the first subset of users; and transmitting the second display instructions to display the second marketing campaign comprises sending the second marketing campaign via email to each user in the second subset of users regardless of whether the second cookie is detected on a respective electronic device of each respective user in the second subset of users.

3. The system of claim 1 wherein:
the first marketing campaign and the second marketing campaign are web marketing campaigns;
transmitting the first display instructions to display the first marketing campaign comprises causing a display of the first marketing campaign, via a first website, to the first subset of users regardless of whether the first cookie is detected on a respective electronic device of each respective user in the first subset of users; and
transmitting the second display instructions to display the second marketing campaign comprises causing a display of the second marketing campaign, via a second website, to the second subset of users regardless of whether the second cookie is detected on a respective electronic device of each respective user in the second subset of users.

4. The system of claim 1 wherein:
the first marketing campaign and the second marketing campaign are keyword marketing campaigns;
transmitting the first display instructions to display the first marketing campaign comprises causing a display of the second marketing campaign, via a first marketing campaign keyword advertisement, to each user in the first subset of users regardless of whether the first cookie is detected on a respective electronic device of each respective user in the first subset of users; and
transmitting the second display instructions to display the second marketing campaign comprises causing a display of the second marketing campaign, via a second marketing campaign keyword advertisement, to each user in the second subset of users regardless of whether the second cookie is detected on a respective electronic device of each respective user in the second subset of users.

5. The system of claim 1 wherein:
determining the one or more first conversion rates comprises compiling first statistics selected from at least one of an open rate, a bounce rate, an email forwarding rate, a clickthrough rate, a cost per conversion, or a cost per click of the first marketing campaign; and
determining the one or more second conversion rates comprises compiling second statistics selected from at least one of an open rate, a bounce rate, an email forwarding rate, a clickthrough rate, a cost per conversion, and a cost per click of the second marketing campaign, wherein the first statistics and the second statistics are stored in the first cookies and the second cookies, respectively.

6. The system of claim 1, wherein the first marketing campaign uses different advertisements than the second marketing campaign.

7. The system of claim 1, wherein the first marketing campaign is transmitted to the first subset of users via different channels of communication than the second marketing campaign is transmitted to the second subset of users.

8. The system of claim 1, wherein the first marketing campaign is transmitted to the first subset of users at a different time than the second marketing campaign is transmitted to the second subset of users.

9. The system of claim 1, wherein the first subset of users and the second subset of users each comprise a respective number of users that is statistically significant.

10. The system of claim 1, wherein the optimal weighting, as updated, is used to create a third subset of users for a third marketing campaign.

11. A method implemented via execution of computing instructions configured to run at a processor and configured to be stored at non-transitory computer-readable media, the method comprising:
receiving a first marketing campaign and a second marketing campaign at the non-transitory computer-readable media;
creating, by the processor, a first subset of users corresponding to the first marketing campaign and a second subset of users corresponding to the second marketing campaign;
transmitting, by a network adapter, first storing instructions to store first cookies on first electronic devices of the first subset of users;
transmitting, by the network adapter, second instructions to store second cookies on second electronic devices of the second subset of users;
detecting, by the processor and the network adapter, a presence of the first cookies on the first electronic devices of the first subset of users;
in response to detecting the presence of the first cookies on the first electronic devices, transmitting, by the network adapter, first display instructions to display the first marketing campaign on first graphical user interfaces (GUIs) on the first electronic devices of the first subset of users;
detecting first interactions with the first marketing campaign displayed on the first GUIs on the first electronic devices of the first subset of users;
detecting, by the processor and the network adapter, a presence of the second cookies on the second electronic devices of the second subset of users;
in response to detecting the presence of the second cookies on the second electronic devices, transmitting, by the network adapter, second display instructions to display the second marketing campaign on second GUIs on the second electronic devices of the second subset of users;
detecting second interactions with the second marketing campaign displayed on the second GUIs on the second electronic devices of the second subset of users;
determining, by the processor and using the first interactions with the first marketing campaign, one or more first conversion rates for the first marketing campaign;
determining, by the processor and using the second interactions with the second marketing campaign, one or more second conversion rates for the second marketing campaign;
comparing, by the processor, the one or more first conversion rates with the one or more second conversion rates to calculate an optimal weighting by:
determining a first range of possible values of the one or more first conversion rates;
determining a first minimum expected value for the first range of possible values of the one or more first conversion rates;
determining a second range of possible values of the one or more second conversion rates;
determining a second minimum expected value for the second range of possible values of the one or more second conversion rates;

calculating a first weighting for the first marketing campaign using the first range of possible values of the one or more first conversion rates;

calculating a second weighting for the second marketing campaign using the second range of possible values of the one or more second conversion rates, wherein:

the optimal weighting is based on the first weighting and the second weighting;

the first weighting represents a first proportion of users to be allocated to the first subset of users; and the second weighting represents a second proportion of the users to be allocated to the second subset of users, wherein the users comprise first and second additional users not in the first or second subset of users;

maximizing a minimum of the optimal weighting using a system of equations by:

maximizing a minimum of the first weighting;
maximizing a minimum of the second weighting;
maximizing the first minimum expected value; and
maximizing the second minimum expected value;

using the optimal weighting between the first marketing campaign and the second marketing campaign to transmit, by the network adapter:

third display instructions to display the first marketing campaign on electronic devices of the first additional users not in the first subset of users or the second subset of users; and fourth display instructions to display the second marketing campaign on electronic devices of the second additional users; and updating, by the processor, the optimal weighting using a conversion rate of the first marketing campaign for the first additional users and a conversion rate of the second marketing campaign for the second additional users, wherein the system of equations comprises:

$$\max_{w} \min_{r \in U} r^T w, \text{ where } \sum_i w_i = 1, w_i \geq 0, \text{ and}$$

$$U = \{r \mid \|\sum (r - \bar{r})\|_2 \leq \rho\},$$

wherein:
w comprises a weight;
r comprises a matrix;
$r^T$ comprises a transpose of the matrix;
i comprises an index number; and
ρ comprises a confidence level.

12. The method of claim 11 wherein:
the first marketing campaign and the second marketing campaign are email marketing campaigns;
transmitting the first display instructions to display the first marketing campaign comprises sending the first marketing campaign via email to each user in the first subset of users regardless of whether the first cookie is detected on a respective electronic device of each respective user in the first subset of users; and
transmitting the second display instructions to display the second marketing campaign comprises sending the second marketing campaign via email to each user in the second subset of users regardless of whether the second cookie is detected on a respective electronic device of each respective user in the second subset of users.

13. The method of claim 11 wherein:
the first marketing campaign and the second marketing campaign are web marketing campaigns;
transmitting the first display instructions to display the first marketing campaign comprises causing a display of the first marketing campaign, via a first website, to the first subset of users regardless of whether the first cookie is detected on a respective electronic device of each respective user in the first subset of users; and
transmitting the second display instructions to display the second marketing campaign comprises causing a display of the second marketing campaign, via a second website, to the second subset of users regardless of whether the second cookie is detected on a respective electronic device of each respective user in the second subset of users.

14. The method of claim 11 wherein:
the first marketing campaign and the second marketing campaign are keyword marketing campaigns;
transmitting the first display instructions to display the first marketing campaign comprises causing a display of the second marketing campaign, via a first marketing campaign keyword advertisement, to each user in the first subset of users regardless of whether the first cookie is detected on a respective electronic device of each respective user in the first subset of users; and
transmitting the second display instructions to display the second marketing campaign comprises causing a display of the second marketing campaign, via a second marketing campaign keyword advertisement, to each user in the second subset of users regardless of whether the second cookie is detected on a respective electronic device of each respective user in the second subset of users.

15. The method of claim 11 wherein:
determining the one or more first conversion rates comprises compiling first statistics selected from at least one of an open rate, a bounce rate, an email forwarding rate, a clickthrough rate, a cost per conversion, or a cost per click of the first marketing campaign; and
determining the one or more second conversion rates comprises compiling second statistics selected from at least one of an open rate, a bounce rate, an email forwarding rate, a clickthrough rate, a cost per conversion, and a cost per click of the second marketing campaign, wherein the first statistics and the second statistics are stored in the first cookies and the second cookies, respectively.

16. The method of claim 11, wherein the first marketing campaign uses different advertisements than the second marketing campaign.

17. The method of claim 11, wherein the first marketing campaign is transmitted to the first subset of users via different channels of communication than the second marketing campaign is transmitted to the second subset of users.

18. The method of claim 11, wherein the first marketing campaign is transmitted to the first subset of users at a different time than the second marketing campaign is transmitted to the second subset of users.

19. The method of claim 11, wherein the first subset of users and the second subset of users each comprise a respective number of users that is statistically significant.

20. The method of claim 11, wherein the optimal weighting, as updated, is used to create a third subset of users for a third marketing campaign.

\* \* \* \* \*